United States Patent [19]

Coughlin

[11] Patent Number: 5,861,220
[45] Date of Patent: Jan. 19, 1999

[54] METHOD AND APPARATUS FOR PROVIDING A MAGNETIC STORAGE AND REPRODUCING MEDIA WITH A KEEPER LAYER HAVING A LONGITUDINAL ANISOTROPY

[75] Inventor: Thomas M. Coughlin, Atascadero, Calif.

[73] Assignee: Ampex Corporation, Redwood City, Calif.

[21] Appl. No.: 692,618

[22] Filed: Aug. 6, 1996

[51] Int. Cl.⁶ .................................. G11B 5/66; G11B 5/84
[52] U.S. Cl. .................................... 428/694 TM; 428/692; 428/900; 360/115; 360/123; 360/125; 307/106; 307/415; 336/213; 335/297; 148/304; 148/403
[58] Field of Search ........................... 428/694 TM, 692, 428/900; 360/115, 123, 125; 307/106, 415; 336/213; 335/297; 148/304, 403

[56] References Cited

U.S. PATENT DOCUMENTS

| 3,079,468 | 2/1963 | Morey . |
| 3,084,227 | 4/1963 | Peters . |
| 3,106,614 | 10/1963 | Fox . |
| 3,127,592 | 3/1964 | Neergaard . |
| 3,188,399 | 6/1965 | Eldridge . |
| 3,239,823 | 3/1966 | Chang . |
| 3,255,307 | 6/1966 | Schuller . |
| 3,314,056 | 4/1967 | Lawrance . |
| 3,319,254 | 5/1967 | Honig . |
| 3,432,837 | 3/1969 | Fan . |
| 3,435,440 | 3/1969 | Nallin . |
| 3,555,204 | 1/1971 | Braun . |
| 4,277,809 | 7/1981 | Fisher et al. . |
| 4,318,136 | 3/1982 | Jeffers . |

(List continued on next page.)

FOREIGN PATENT DOCUMENTS

| 71361/74 | 1/1976 | Australia . |
| 0472162A | 2/1992 | European Pat. Off. . |
| 3509020 | 9/1985 | Germany . |
| 53-65712 | of 1978 | Japan . |
| 818811 | 8/1959 | United Kingdom . |
| 822240 | 10/1959 | United Kingdom . |
| 844081 | 8/1960 | United Kingdom . |
| 2073472 | 10/1981 | United Kingdom . |
| WO87/03728 | 6/1987 | WIPO . |
| 93/12928 | 7/1993 | WIPO . |

OTHER PUBLICATIONS

M. Mallary, S. Batra, S. Liu, G.C. Rauch, P.K. Ng and G. Neely, Improved cross–talk performance from multilayer longitudinal media using a Hall head, J. App. Phys. 73 (10), May 15, 1993.

IEEE Transactions on Magnetics, "A Yoke Magnetoresistive Head for High Track Density Recording", Maruyama et al., vol. Mag–23, No. 5, Sep. 1987, pp. 2503–2505.

IEEE Transactions on Magetics "Effect of Induced Uniaxial Magnetic Anisotropy of Ni–Fe Keeper Layer on the Recording Properties of Longitudinal Co–Cr–Ta/Cr Thin Film Media", Sin et al., vol. 31, No. 6, Nov. 1995.

(List continued on next page.)

Primary Examiner—Daniel Zirker
Attorney, Agent, or Firm—Cesari And McKenna; John G. Mesaros

[57] ABSTRACT

A magnetic storage medium comprises a keeper layer of soft magnetic, saturable material disposed upon a magnetic storage layer. The keeper layer is disposed above the magnetic storage layer, and a non-magnetic "break" layer may be used between the keeper and the storage layer to reduce the exchange coupling between these layers. To increase the ability of the keeper layer to shunt flux from the magnetic storage layer, a longitudinal anisotropy is induced in the keeper layer. This establishes a desired magnetic orientation of the keeper which facilitates maintaining the regularity (i.e., relative uniformity) of the transitions, and reducing the magnetic interaction between transitions as the spacing between transitions is reduced to provide denser media. Specifically, the longitudinal anisotropy may be oriented either circumferentially or radially relative to the plane of rotation of the magnetic storage layer.

7 Claims, 6 Drawing Sheets

U.S. PATENT DOCUMENTS

| | | |
|---|---|---|
| 4,410,603 | 10/1983 | Yamamori et al. . |
| 4,464,691 | 8/1984 | Sawazaki . |
| 4,530,016 | 7/1985 | Sawazaki . |
| 4,535,369 | 8/1985 | Sawazaki . |
| 4,613,915 | 9/1986 | Crouse et al. . |
| 4,642,709 | 2/1987 | Vinal . |
| 4,657,812 | 4/1987 | Hatanai et al. . |
| 4,657,819 | 4/1987 | Funaki . |
| 4,687,712 | 8/1987 | Sugita et al. . |
| 4,698,711 | 10/1987 | Vinal . |
| 4,717,592 | 1/1988 | Nagao et al. . |
| 4,782,415 | 11/1988 | Vinal . |
| 4,985,795 | 1/1991 | Gooch . |
| 5,041,922 | 8/1991 | Wood et al. . |
| 5,062,007 | 10/1991 | Nakatsu et al. . |
| 5,105,323 | 4/1992 | Ruigrok . |
| 5,119,255 | 6/1992 | Gooch . |
| 5,130,876 | 7/1992 | Gooch ................................. 360/115 |
| 5,132,957 | 7/1992 | Mashimo . |
| 5,147,732 | 9/1992 | Shiroishi et al. . |
| 5,153,796 | 10/1992 | Gooch . |
| 5,176,965 | 1/1993 | Mallary . |
| 5,189,572 | 2/1993 | Gooch . |
| 5,216,657 | 6/1993 | Nishiuchi et al. . |
| 5,227,939 | 7/1993 | Gooch ................................. 360/115 |
| 5,243,588 | 9/1993 | Maeda et al. . |
| 5,331,492 | 7/1994 | Komai et al. . |
| 5,337,203 | 8/1994 | Kitada et al. . |
| 5,431,969 | 7/1995 | Mallary . |
| 5,483,403 | 1/1996 | Voegeli . |
| 5,493,464 | 2/1996 | Koshikawa . |
| 5,514,452 | 5/1996 | Araki et al. . |
| 5,576,085 | 11/1996 | Lal et al. ............................. 428/65.3 |

OTHER PUBLICATIONS

IEEE Transactions on Magnetics, "A High Resolution Flying Magnetic Disk Recording System with Zero Reproduce Spacing Loss", Gooch et al., vol. 27, No. 6, Nov. 1991, pp. 4549–4554.

IEEE Transactions on Magnetics, "New Concepts for Perpendicular Magnetic Recording Hard Disk System", Nakamura et al., vol. 27, No. 6, Nov. 1991, pp. 4555–4560.

Marvin Camras, Magnetic Recording Handbook, 1988.

James E. Opfer, Bruce F. Spenner, Bangalore R. Natarajan, Richard A. Baugh, Edward S. Murdock, Charles C. Morehouse and David J. Bromley, Thin–Film Memory Disc Development, 1985, pp. 4–10.

Eberhard Koste, Fernseh–Und Kino–Technik, 1984, pp. 425–432.

W. Earl Stewart, Magnetic Recording Techniques, 1958, pp. 87–104.

J. Flora and J.R. Werning, Multitrack Probe Type Recording Transducer, IBM Technical Disclosure Bulletin.

Otto Kornei, Survey of Flux–Responsive Magnetic Reproducing Heads, Journal of Audio Engineering Society, vol. 2, No. 3, Jul. 1954.

Dirk Quak, Influence of the Layer of Thickness of a Double–Layer Medium on the Reproduced Signal in Perpendicular Recording, IEEE Transactions On Magnetics, vol. Mag.–19, No. 4, Jul 1983.

Shun–ichi Iwasaki, Perpendicular Magnetic Recording, IEEE Transactions On Magnetics, vol. MAG–16, No. 1, Jan. 1980.

Shun–ichi Iwasaki, Yoshihisa Nakamura and Isao Watanabe, Research Institute, "Perpendicular Recording/Playback on Composite Film Media" No. 37, Electro–communication, Tohoku University, Memo for the 1979 Electro–communication Society (Semiconductor and Material Department) Meeting No. 191.

Shun–ichi Iwasaki, Kazuhiro Ohuchi and Naoki Honda, "Anisotropy and Film Structure of Perpendicualr Recording Medium" No. 38, Research Institure, Electro–communication, Tohoku University, Memo for the 1979 Electro–communicaton Society (Semiconductor and Material Department, Meeting No. S2–5.

Shun–ichi Iwasaki and Yoshihisa Nakamura, "One Method for Magnetic Recording Using Composite Recording Medium" No. 46, Memo for the 1979 Electro–communication Society Meeting No. 241.

Shun–ichi Iwasaki, Yoshihisa Nakamura and Masaki Watanabe, "Relationship between Recording Sensitivity and Reproducing Sensitivity in Perpendicular Recording" No. 48, Memo for the 1979 Tohoku–area Electronic Related Society Meeting No. 1F2.

Shun–ichi Iwasaki, Kazuhiro Ohuchi and Naoki Honda, "Magnetic Behaviors of Composite Film Medium in Perpendicular Recording" No. 39, Research Institute, Electro–communication, Tohoku University, Abstracts of the 3rd Annual Conference on Magnetics in Japan 1979 (24pA–6).

Shun–ichi Iwasaki, Yoshihisa Nakamura, Isao Watanabe and Masaki Watanabe, "High Density Recording and Reproducing with Perpendicular Magnetic Head" No. 40, Research Institute, Electro–communication, Tohoku University.

Shun–ichi Iwasaki, Yoshihisa Nakamura and Makoto Koisumi, "Experiments of Perpendicular Magnetic Recording with Magnified Head and Medium" No. 41, Research Institute, Electro–communication, Tohoku University, Abstract of the 3rd Annual Conference on Magnetics in Japan, 1979 (24pA–13).

METHOD AND APPARATUS FOR PROVIDING A MAGNETIC STORAGE AND REPRODUCING MEDIA WITH A KEEPER LAYER HAVING A LONGITUDINAL ANISOTROPY

CROSS REFERENCE TO RELATED APPLICATIONS

This application contains subject matter related to the following commonly assigned, co-pending U.S. patent application Ser. No. 08/674,768 filed Jun. 28, 1996, designated attorney docket number 112008-23/AMP-3860, entitled "Magnetic Storage and Reproducing System With a Low Permeability Keeper and a Self-Biased Magnetoresistive Reproduce Head".

TECHNICAL FIELD

The present invention relates to magnetic recording and reproducing systems, and in particular to a magnetic recording and reproducing system having a magnetic storage medium which includes a magnetic storage layer and an associated keeper layer with longitudinal anisotropy.

BACKGROUND OF THE INVENTION

In conventional wideband, high density magnetic signal processing, magnetic flux transferred to or from a magnetic storage medium permeates a magnetic core of a magnetic transducer (i.e., a head). During reproduction operation modes this flux produces an induced output voltage which, after suitable amplification, is a reproduced representation of the magnetic flux from the media that permeates the core and is suitable for use by a utilization device. During record operation modes, the permeating flux results from current applied to the transducer coil winding, and the flux fringes from a physical gap provided in the core for recording a representative signal in the magnetic storage medium.

One problem with prior art magnetic storage systems is that various losses occur during signal transfers between the magnetic storage medium and the transducer. One of the more significant losses, called "spacing loss", results from the physical spacing between the magnetic storage medium and the transducer. Spacing loss is particularly deleterious during reproduction operations where the effects of such loss are more significant. Prior efforts to reduce spacing loss primarily involved reducing the physical spacing by placing the transducer as close to the magnetic storage medium surface as operating conditions permitted. Such positioning, however, is accompanied by an increase in the likelihood of collisions between the transducer and magnetic storage medium, particularly in devices in which the transducer is normally supported above and out of contact with the storage medium surface, i.e., the transducer "flies" relative to the storage medium. On the other hand, if the transducer is in physical contact with the medium, damaging wear occurs due to the contact. However, it should be noted that if contact heads are used, the head is still separated from the storage medium by the carbon overcoat and lubricant that are standard in such disks.

U.S. Pat. No. 5,041,922 to Wood et al (hereinafter "Wood et al."), assigned to the assignee of the present invention, discloses a magnetic recording system which includes a magnetic medium having an overlying or underlying "keeper" layer of magnetically saturable high permeability material. The keeper layer facilitates denser storage media by reducing the fringing fields from the media. As disclosed in Wood et al., the properties of the keeper layer are selected to act as an extension of the head poles, thereby effectively bringing the head closer to the magnetic medium and reducing the spacing loss. Since one of the material properties of the head poles is high permeability, the keeper layer material in Wood et al was also selected to have high permeability.

U.S. Pat. No. 5,431,969 entitled "Method of Making a Magnetic Medium for Longitudinal Recording" to Michael L. Mallary (hereinafter "Mallary") discloses that a magnetic image layer (somewhat analogous to the keeper layer disclosed in Wood et al.) may have a uniaxial anisotropy. In particular, Mallary discloses several techniques for inducing the uniaxial anisotropy. However, each of the techniques is problematic in practice. For example, applying a magnetic field while the soft magnetic material of the image layer is being deposited interferes with the deposition process of the image layer when sputtering is used to deposit the layer. Specifically, the magnetic field which is used to establish the anisotropy in the magnetic image layer may interfere with the field which controls the sputtering process. The other techniques disclosed in Mallary to induce the anisotropy in the magnetic storage layer include (1) performing an anneal in a magnetic field, (2) controlling the angle of incidence in the case of vacuum deposition or (3) protexturing the substrate. However, these techniques are also problematic.

Hence, there is a need for a technique for inducing a desired anisotropy in the keeper layer to increase the system signal to noise ratio and reduce the intersymbol interference.

SUMMARY OF THE INVENTION

Accordingly, it is an object of the present invention to provide a magnetic storage and reproducing system with an improved storage density through improved system signal-to-noise ratio and reduced intersymbol interference.

Yet another object is provide a method for inducing a longitudinal anisotropy in a soft magnetic keeper layer of a magnetic storage medium.

According to the present invention, a magnetic storage medium comprises a keeper layer of soft magnetic, saturable material associated with a magnetic storage layer. A non-magnetic "break" layer may be used between the keeper and the storage layer to reduce the exchange coupling between these layers. To increase the ability of the keeper layer to shunt flux from the magnetic storage layer, a longitudinal anisotropy is induced in the keeper layer. This establishes a desired magnetic orientation of the keeper which facilitates maintaining the regularity (i.e., relative uniformity) of the transitions, and reducing the magnetic interaction between transitions as the spacing between transitions is reduced to provide denser media. Magnetic orientation of the keeper layer can also be used to minimize the playback noise from the keeper itself. Specifically, the longitudinal anisotropy may be oriented either circumferentially or radially relative to the plane of rotation of the magnetic storage layer.

The keeper layer preferably has a relatively low permeability (e.g., in the range 7 to 1000). When operating in an unsaturated state, the relatively soft magnetic material keeper layer acts as a shunt path for flux emanating from recorded transitions on the magnetic storage layer, thereby producing an image field of the recorded transitions in the relatively soft magnetic material which has the effect of reducing the demagnetization, and thus reducing the recorded transition length. This shunt path substantially reduces the flux levels emanating from the recorded transitions and reaching a transducer head of the system. The shunt path also increases the stability of the recorded transitions with respect to thermal demagnetization.

Consequently, to read data from a recorded transition on the magnetic storage layer, a saturating bias current is applied to windings of the head, creating a bias flux of sufficient strength and direction so as to saturate a portion of the soft magnetic material proximate that transition. While saturated or driven close to saturation, this portion of the soft magnetic material can no longer shunt flux emanating from the recorded transition. This allows substantially all of the flux from the recorded transition to couple to the head.

The soft magnetic layer is referred to as a "keeper layer" in the same sense as that term is used in Wood et al, since in its unbiased state, the keeper shunts substantially all the flux from recorded transitions on the magnetic storage layer, thus reducing the fields fringing from that storage layer. Data representative of those recorded transitions can only be reproduced when the bias flux is applied to saturate the associated portions of the keeper layer and, thereby, terminate the shunt. The shunting of flux by the keeper also impacts the side fringing fields and the effective track width. This, in turn, is a factor in obtaining higher track density in the recording system.

The low permeability keeper layer is formed of a relatively thin layer of a soft magnetic material having a relatively high coercivity and low permeability, which saturates at a relatively low bias flux level, but cannot be saturated by flux from the magnetic storage layer alone. In general, the soft magnetic material may be any permeable alloy, and suitable materials include Permalloy, Sendust and Super Sendust.

Preferably, the permeability of the keeper layer is sufficient to provide a suitable shunt (or imaging) of the recorded transitions when the head is not applying a bias flux. For example, a permeability as low as seven (7) may provide a suitable shunt effect (note, the permeability of air is one). The keeper layer then can be made relatively thin, thus reducing the record losses.

According to another aspect of the present invention, to establish the longitudinal anisotropy in the keeper layer, after depositing the magnetic storage layer but prior to depositing the keeper layer, the partially fabricated media is rotated adjacent to pole pieces connected to a permanent magnet or an electromagnet. The magnetic fields from the pole pieces act upon the magnetic storage layer as the partially fabricated media is rotated relative to the pole pieces. These fields establish a magnetic remanence in the magnetic storage layer, and as the keeper layer is subsequently deposited, this remanent magnetization induces the desired longitudinal anisotropy in the keeper layer. If the media includes a non-magnetic break layer between the magnetic storage layer and the keeper layer, the partially fabricated media may be rotated adjacent to the permanent magnet either before or after depositing the non-magnetic break layer.

The pole pieces of the permanent magnet or electromagnet are oriented to establish a field which provides either circumferential or radial anisotropy, and the strength of the field is preferably about twice the coercivity of the magnetic storage layer. The step of rotating the partially fabricated media adjacent to the magnet is preferably an additional processing step performed while the partially fabricated disk is within the low pressure, high temperature atmosphere of the vacuum chamber. The higher temperature energizes the atoms of the deposited keeper film which facilitates the introduction of the desired anisotropy when the keeper is deposited.

An advantage of the present invention is that the longitudinal anisotropy of the keeper allows an increase in recording density due to the improved system signal to noise ratio and reduced intersymbol interference. Specifically, orienting the keeper with a desired magnetic orientation facilitates maintaining regularity (i.e., relative uniformity) of the transitions throughout the media, and reducing the magnetic interaction between transitions. The orientation can also be used to reduce the electrical noise induced by the keeper.

According to another aspect of the invention, saturation of the keeper layer is effected in a manner that allows flux from only one recorded transition to couple to the head during a read operation. Therefore, substantially all the flux from the adjacent recorded transitions is shunted by the unsaturated portions of the keeper layer.

These and other objects, features and advantages of the present invention will become more apparent in light of the following detailed description of preferred embodiments thereof, as illustrated in the accompanying drawings.

DESCRIPTION OF A PREFERRED EMBODIMENT

Figure 1:
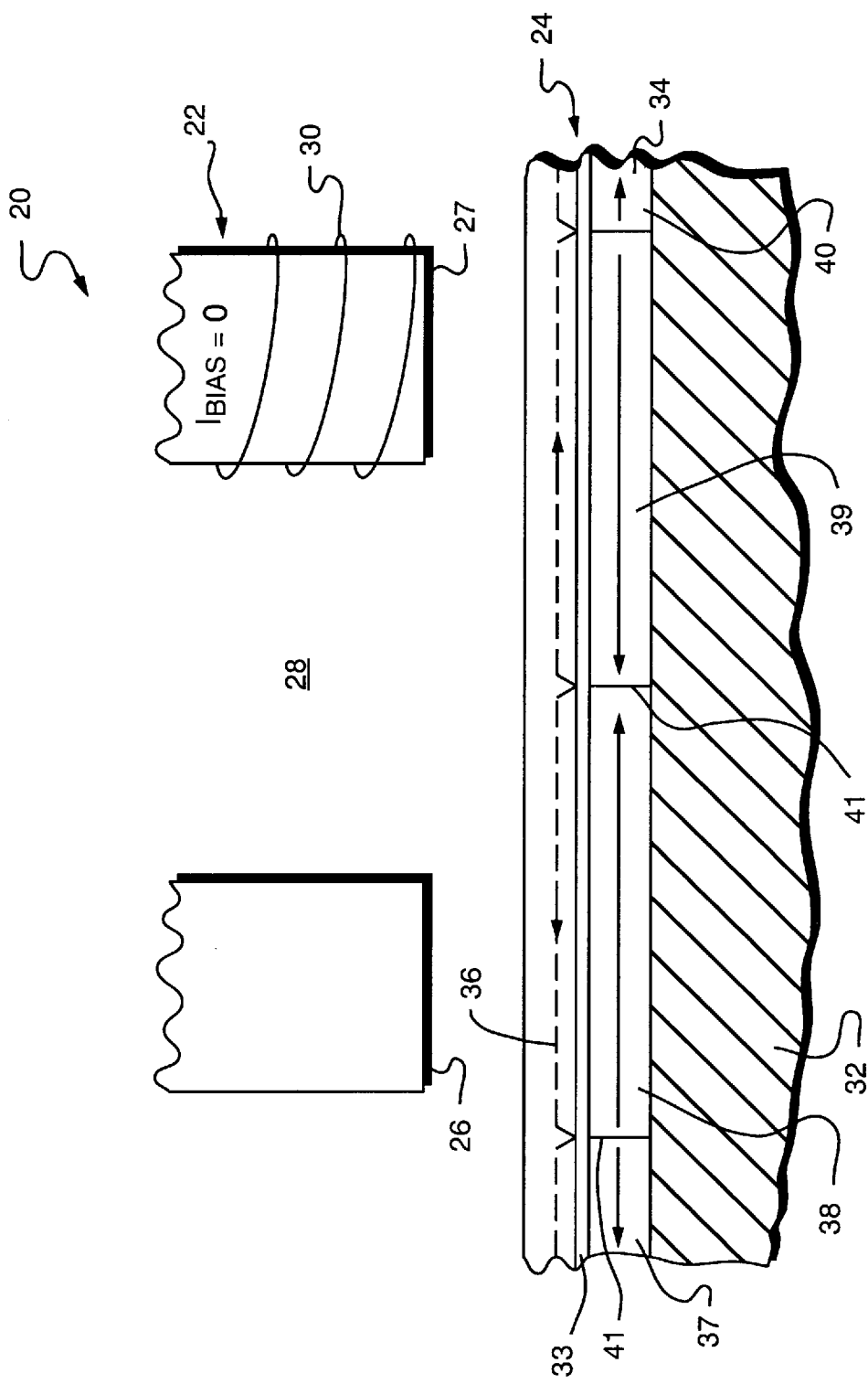
FIG. 1 is a schematic cross sectional illustration of a magnetic storage and reproducing system featuring a keepered magnetic storage medium and a portion of a transducer.

Referring now to FIG. 1, a magnetic storage system 20 is illustrated comprising a magnetic transducer 22 which writes data to and reads data from a magnetic storage medium 24. The transducer 22 comprises poles 26, 27 which form a gap 28, and wherein an electrically conductive winding 30 is disposed about one of the poles. Although the transducer 22 is shown for ease of illustration as an inductive head, one of ordinary skill will appreciate that other head designs such as a MIG, or a magnetoresistive (MR) head may also be used.

The magnetic storage medium 24 includes a substrate 32, a magnetic storage layer 34 and a low permeability keeper layer 36. The magnetic storage medium 24 may either be a rigid or flexible disk. The present invention shall be discussed in the context of a rigid disk, however, it should be understood that the present invention is also applicable to flexible disks. The substrate 32 is a non-magnetic material such as aluminum, plastic or glass. A non-magnetic break layer 33 is positioned between the storage layer 34 and the keeper layer 36. Such a structure has been found to improve the performance of the keeper system.

The magnetic storage layer 34 is segmented into a plurality of record regions 37–40 which define record transitions 41 at their abutting boundaries. Either digital or analog signals may be recorded in the magnetic storage medium in a variety of conventional manners known in the art. In the illustrative embodiment, digital signals are preferably recorded in the magnetic storage layer in longitudinal fashion. The storage layer 34 is a high coercivity, hard magnetic material, such as an alloy of cobalt, chromium and tantalum. The layer may include magnetic material dispersed within a binder, or it may be a film of high coercivity magnetic material or metal alloy. The layer is preferably chosen to have a longitudinal anisotropy which provides record magnetization which is predominantly longitudinal (i.e., horizontal) to the paper as oriented FIG. 1. The magnetization polarity of each record region 37–40 is represented by horizontal arrows, wherein the arrow direction is indicative of the polarity of the magnetization in each region.

The magnetic storage medium 24 also includes the keeper layer 36. The keeper layer 36 is a soft magnetic material of either relatively low permeability (e.g., 7–1000) or high permeability (e.g., greater than 1000) which can be saturated by a small bias flux. However, the material does not saturate when the flux from the magnetic storage layer 34 is the only flux acting on the keeper layer (i.e., when the bias flux is not applied). Suitable materials include Permalloy, Sendust and Super Sendust.

Figure 2:
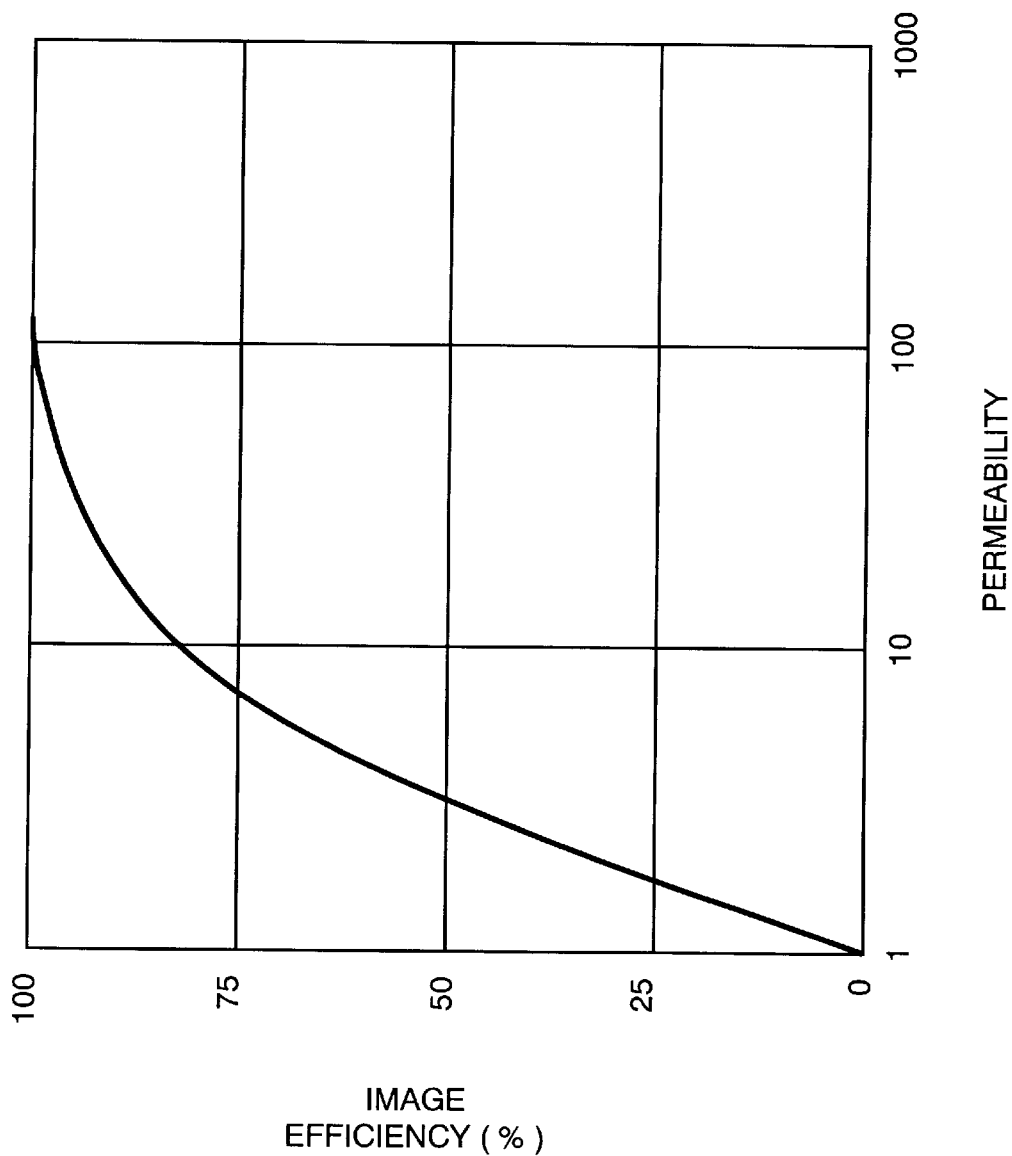
FIG. 2 is a plot of image efficiency versus permeability.

The characteristics of the keeper layer 36 are selected to ensure that in the absence of a bias flux from the winding 30, the layer 36 shunts flux from the record regions 37–39 to create a magnetic image of the regions in the portion of the keeper abutting the record region. FIG. 1 illustrates the case where the bias current $I_{bias}$ through the winding 30 is zero. In this situation, the keeper operates as a shunt, establishing an image in the keeper layer of the magnetization in the record regions. For example, the portion of the keeper layer 36 adjacent to record region 38 conducts flux (shown as a dotted line) which forms an inverse image as compared to the flux permeating through record region 38. The quality of the image (and therefore the effectiveness of the shunt) can be characterized by an image efficiency which is graphically illustrated in FIG. 2 as a function of the keeper layer permeability. The image efficiency is about 75% for a permeability of approximately seven (where the permeability of air is one), and it approaches 100% for permeabilities above one-hundred. The image efficiency indicates the effectiveness of the keeper layer as a shunt. As the image efficiency approaches 100%, the more effective the keeper layer is as a shunt, and therefore, fewer fringing fields emanate from the magnetic storage medium 24. "Low permeability" includes permeabilities of less than about 1000. U.S. patent application entitled "Magnetic Storage and Reproducing System With a Low Permeability Keeper and a Self-Biased Magnetoresistive Reproduce Head" filed Jun. 28, 1996, designated U.S. patent application Ser. No. 08/674,768 and assigned to the assignee of the present invention, discloses a system employing a low permeability keeper, and this application is hereby incorporated by reference.

Figure 3:
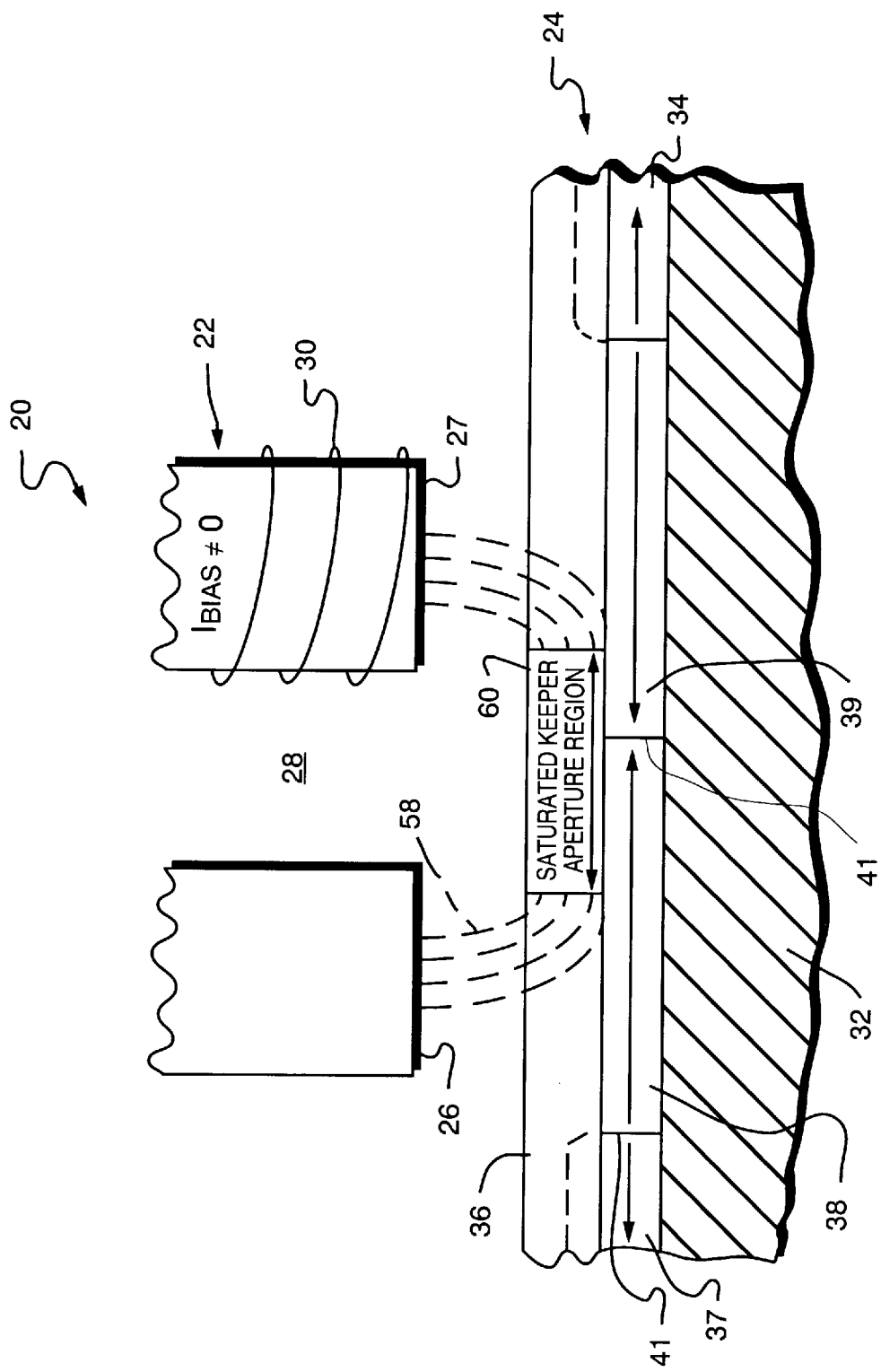
FIG. 3 is a schematic cross sectional illustration of a keepered magnetic storage medium and a portion of a transducer having a non-zero bias current applied to a transducer pole winding which saturates a portion of the keeper to form an aperture region in the keeper.

Referring to FIG. 3, during reproduction operations, a DC bias current is applied to the winding 30 to create a bias flux 58 which permeates and saturates the portion of the keeper layer 36 located between the poles 26, 27, to establish to a saturated aperture region 60. Since the aperture region 60 is saturated by the bias flux 58, the shunt path through that portion of the keeper is substantially terminated. Significantly, as the disk is rotated and a record transition 41 is passed "through" the saturated aperture region 60, flux from the record transition 41 fringes out of the aperture region and induces a head output voltage indicative of the data represented by the record transition. The saturated aperture region 60 operates as an aperture, through which flux from the magnetic storage layer 34 is allowed to pass because of the saturated nature of the region 60.

Figure 4B:
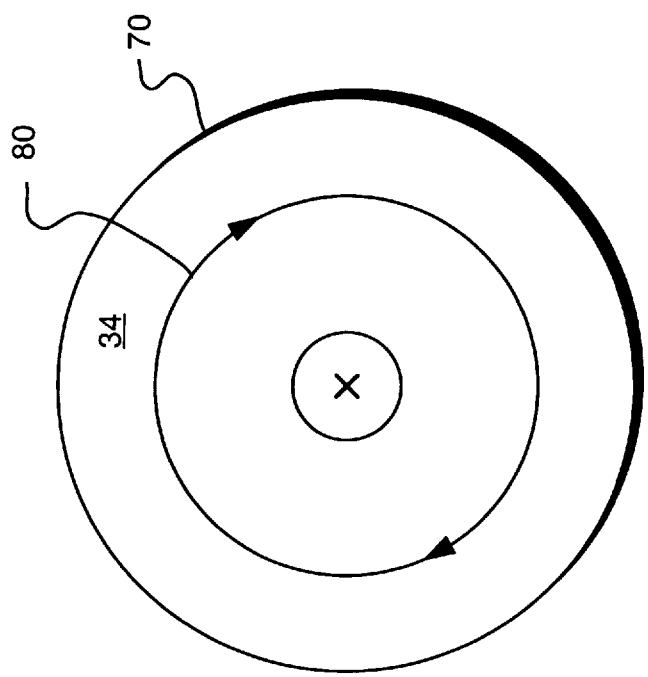
FIG. 4B is a top view of the partially fabricated media of FIG. 4A following the step of rotating the magnet over the media to establish a longitudinal remanence in the magnetic storage layer of the partially fabricated media.
Figure 4A:
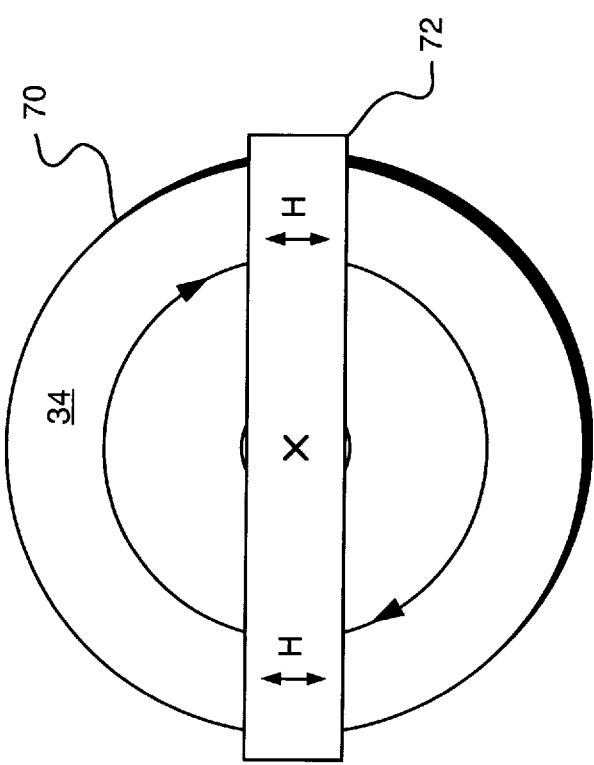
FIG. 4A is a top view of a magnet mounted coaxial with and over a partially fabricated media.

According to the present invention, the keeper layer 36 has a longitudinal anisotropy which is established during the fabrication of the magnetic storage medium 24. Referring to FIG. 4A, following the deposition of the magnetic storage layer 34 in a known manner, partially fabricated medium 70 is positioned coaxial with and below a magnet 72 which contains pole pieces whose magnetic orientation is selected to establish a circumferential remanent magnetization in the magnetic storage layer 34. Specifically, the magnet 72 and the partially fabricated medium 70 are positioned such that the medium is rotated at an angular velocity ω relative to the magnet. The strength of the field applied by the magnet is preferably twice the coercivity of the magnetic storage layer 34. The magnet pole pieces can also be located on a smaller device (a head) which is scanned across the surface of the media to induce a circumferential magnetic anisotropy.

Rotating the magnet coaxial with and above the partially fabricated media is an additional step performed within the vacuum chamber of the fabrication equipment (not shown). If a non-magnetic break layer (not shown) is deposited over the magnetic storage layer 34, the processing step of spinning the partially fabricated media relative to the permanent magnetic 72 may occur either before or after the non-magnetic break layer is deposited. FIG. 4B is a top view of the partially fabricated disk subsequent to establishing circumferential remanent magnetization 80 in the magnetic storage layer 34.

Figure 5B:
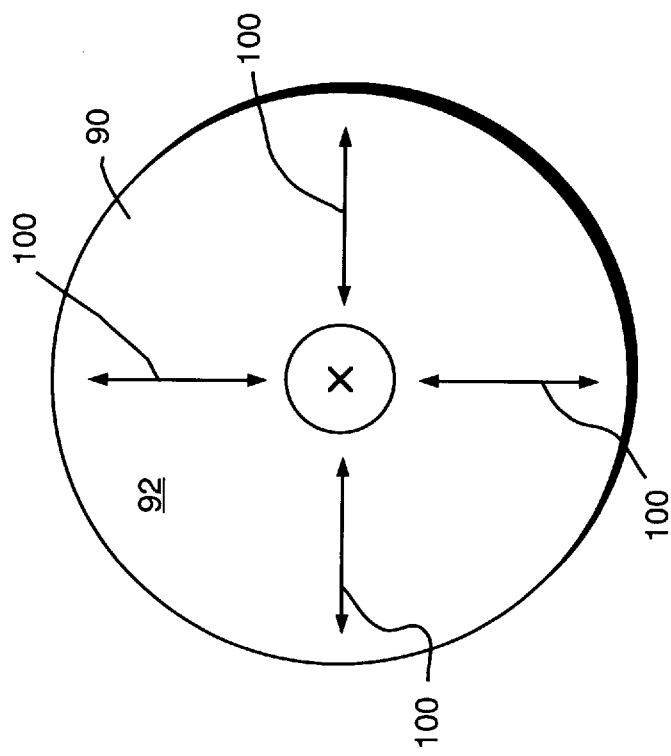
FIG. 5B is a top view of the partially fabricated media of FIG. 5A following the step of rotating the magnet over the media to establish the radial remanence in the magnetic storage layer.
Figure 5A:
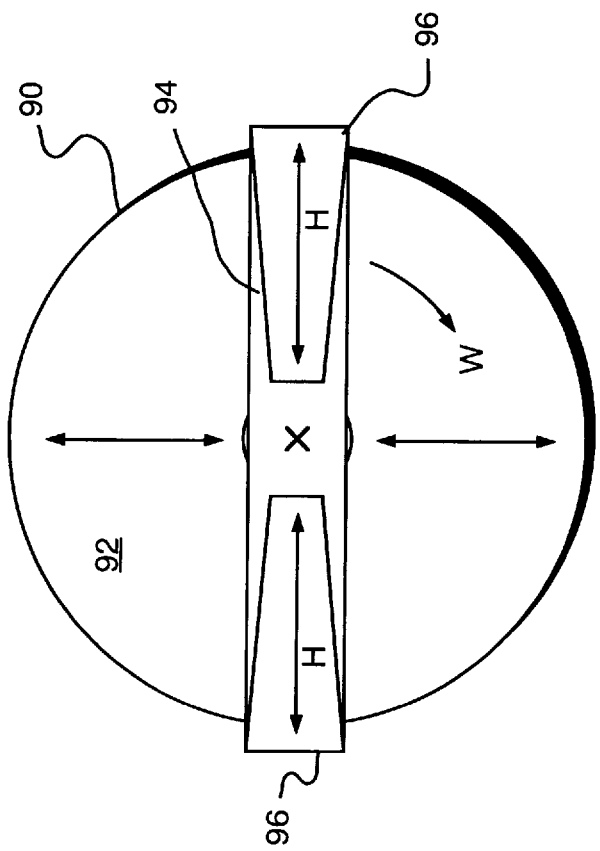
FIG. 5A is a top view of a magnet mounted coaxial with and over a partially fabricated media to establish a radial remanence in a magnetic storage layer of the partially fabricated media.

FIG. 5A illustrates a top view of a partially fabricated disk 90 comprising the magnetic storage layer 92, and a magnet 94 which comprises pole pieces 96. The magnet is disposed above and mounted rotatably coaxial with the partially fabricated media 90. As the media is rotated relative to the magnet, the radial field from pole pieces 96 establishes a radial magnetic remanence 100 in the magnetic storage layer 92, as shown in FIG. 5B. Again, the field strength from the magnet is preferably about twice the coercivity of the magnetic storage layer 92. The magnet pole pieces can also be located on a smaller device (a head) which is scanned across the surface of the media to induce radial magnetic anisotropy.

Recent testing by the inventors has unexpectedly determined that the relatively low permeability keeper layer is capable of achieving advantages similar to those disclosed in U.S. Pat. No. 5,041,922 to Wood et al, which is assigned to the assignee of the present invention. As articulately disclosed in Wood et al, the high permeability keeper layer was selected based upon the premise that the keeper layer was required to have a permeability which approximated the permeability of the head poles. Principally, this premise was based upon the belief that the high permeability keeper would effectively operate as an extension of the head poles (although not a physical extension) to reduce spacing losses.

During recent testing of a rigid disk drive system with a keeper layer applied to the magnetic storage layer, the inventors measured the permeability of a keeper layer applied over a magnetic storage layer of a rigid disk. The keeper layer had been deposited onto the magnetic storage layer with the intent of establishing a high permeability keeper. However, measurements indicate that the permeability of the keeper layer was actually much less than the permeability which the inventors believed was required to operate as an effective keeper. Unexpectedly, even with this low permeability keeper, the keepered disk drive still achieved significant performance improvements over non-keepered disk drives.

Figure 6:
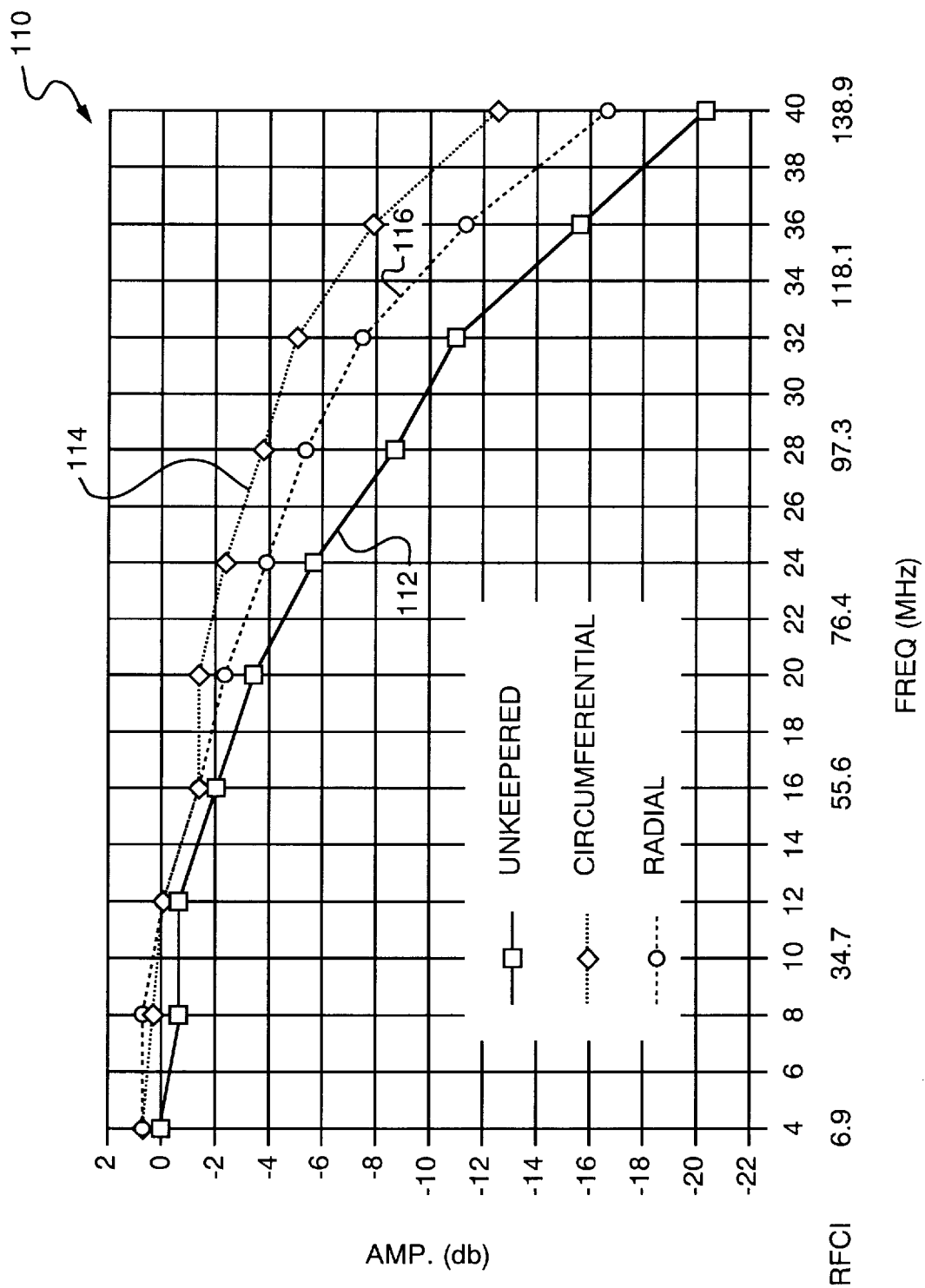
FIG. 6 a plot of test data comparing the gain for a conventional disk drive system without a keeper layer against a first disk drive system with a low permeability keeper layer having circumferential anisotropy and a second disk drive system with a low permeability keeper layer having radial anisotropy.

FIG. 6 illustrates a frequency response plot 110 of test data comparing the amplitude gains for a conventional disk drive system without a keeper layer, and a first disk drive system having a low permeability keeper layer as shown in FIGS. 1 and 3. The relative output in decibels (dBs) value is plotted along a vertical axis while recording density is plotted along a horizontal axis. Frequency response values in dB are plotted for a plurality of points along a first line 112 for the conventional non-keepered disk, while the output values in dB for the low permeability keepered media with circumferential anisotropy are plotted along a second line 114. As shown, the output levels of the keepered disk are consistently several dB's higher than the output values for the non-keepered media and the difference is larger at higher operating frequencies. The output values for the low permeability keeper having radial anisotropy are plotted along a third line 116. As shown, the media having a keeper with longitudinal anisotropy provides the best improvement in system gain. It is believed that the magnetically oriented keeper layer of the present invention will also provide several dB's improvement over devices having an isotropic keeper.

These test measurements plotted in FIG. 6 were taken using a rigid disk drive spin stand available from Teletrack Corporation, and a Sunward metal in gap transducer head. The conventional disks were manufactured by Store Media and include a protective carbon layer approximately 150–170 Angstroms thick located over the magnetic storage layer. The low permeability disks having a longitudinally oriented keeper were constructed by first depositing a magnetic storage layer having a coercivity of about 2,000 Oersteds over a substrate in a low vacuum. The partially fabricated media was then positioned coaxial with and below a permanent magnet which contained pole pieces whose magnetic orientation was selected to provide the desired longitudinal remanent magnetization in the magnetic storage layer. The partially fabricated media was then rotated relative to the pole pieces of a magnet in order to establish a remanent magnetization over the entire magnetic storage layer. The field strength from the magnet was approximately 1,500 Oersteds (preferably the field strength would be on the order of 4,000 Oersteds in order to establish a stronger remanence). A layer of Sendust was then deposited 75–250 Angstroms thick to establish the keeper layer having a DC permeability of less than 100. The magnetic remanence from the magnetic storage layer oriented the atoms of the keeper while the keeper layer was deposited to provide the desired longitudinal anisotropy. The poles of the magnetic were oriented as shown in FIGS. 4A and 5A in order to establish the circumferential and radial anisotropy, respectively.

The keeper layer can be deposited by any suitable deposition technique known in the art, including sputtering. Early test results indicate that a Sendust keeper layer having a thickness of about 100 Angstroms provides an improved areal packing density. In general, the keeper layer should be made as thin as possible in order to reduce the recording losses.

The low permeability keeper layer allows the head flying above the magnetic storage medium to operate independent from the keeper, and during the reproduction mode, the head only acts to bias the keeper and as a flux detector.

It should also be readily understood that other coats and overcoats may be used along with the disclosed layers in the practice of the present invention. For example, a non-magnetic layer can be disposed on the magnetic storage layer to interrupt effects of magnetic exchange coupling between the keeper layer and the magnetic storage layer, allowing these layers to react separately to magnetic flux and allowing the keeper layer to shunt the flux from the storage layer. The materials for this non-magnetic layer may include chromium, carbon or silicon. An example of a magnetic storage media arrangement disclosing such a non-magnetic layer is International Patent Application No. WO 93/12928, published Jul. 8, 1993, and entitled "Magnetic Recording Media Employing Soft Magnetic Material", which is hereby incorporated by reference.

Although the present invention has been shown and described with respect to preferred embodiments thereof, it should be understood by those skilled in the art that various other changes, omissions and additions to the form and detail thereof may be made therein without departing from the spirit and scope of the invention.

What is claimed is:

1. A magnetic recording medium, comprising:
   a substrate;
   a magnetically coercive material disposed on said substrate for storing magnetic signals; and
   a magnetically permeable, magnetically saturable material disposed on said substrate, wherein said magnetically saturable material has a circumferential anisotropy, and has a low permeability when said magnetically saturable material is unsaturated.

2. The magnetic recording medium of claim 1, wherein said magnetically saturable material has a DC permeability of less than 1000 when said material is unsaturated.

3. The magnetic recording medium of claim 1, wherein said magnetically saturable material has a DC permeability between five and one-hundred when said material is unsaturated.

4. The magnetic recording medium of claim 1, wherein said magnetically coercive material is disposed between said substrate and said magnetically saturable material.

5. The magnetic recording medium of claim 1, wherein said magnetically saturable material is disposed over said magnetically coercive material and said substrate.

6. A magnetic recording medium for use in a recording/reproducing system in which magnetic information is transferred between a transducer and the record medium, comprising:
   a non-magnetic substrate;
   a layer of magnetically coercive material in which the magnetic information is stored; and
   a low permeability magnetic material having a circumferentially oriented anisotropy disposed on the substrate in a manner such that said low permeability material becomes selectively saturated during the transfer of information between the transducer and said layer of magnetically coercive material, whereby flux from one recorded transition is coupled to the head during a read operation.

7. The magnetic recording medium of claim 6 wherein the thickness of said layer of low permeability magnetic material is such that a portion of said layer becomes saturated by a flux whose magnitude is less than that required to alter the magnetization of said coercive layer.

* * * * *